(12) United States Patent
Li et al.

(10) Patent No.: US 10,712,520 B2
(45) Date of Patent: Jul. 14, 2020

(54) PHOTOELECTRIC COMPOSITE CABLE

(71) Applicant: ZHONGTIAN POWER OPTICAL CABLE CO., LTD., Nantong (CN)

(72) Inventors: Ming Li, Nantong (CN); Cang-Ping He, Nantong (CN); Jie Lu, Nantong (CN); Xu-Guang Miao, Nantong (CN); Hai-Jun Xue, Nantong (CN)

(73) Assignee: ZHONGTIAN POWER OPTICAL CABLE CO., LTD., Nantong (CN)

( * ) Notice: Subject to any disclaimer, the term of this patent is extended or adjusted under 35 U.S.C. 154(b) by 0 days.

(21) Appl. No.: 16/395,514

(22) Filed: Apr. 26, 2019

(65) Prior Publication Data

US 2019/0250357 A1 Aug. 15, 2019

Related U.S. Application Data

(63) Continuation-in-part of application No. PCT/CN2017/101232, filed on Sep. 11, 2017.

(30) Foreign Application Priority Data

Jul. 12, 2017 (CN) .......................... 2017 1 0565293

(51) Int. Cl.
*H01B 13/08* (2006.01)
*H01B 13/14* (2006.01)
(Continued)

(52) U.S. Cl.
CPC .......... *G02B 6/4488* (2013.01); *E21B 17/003* (2013.01); *G02B 6/4492* (2013.01);
(Continued)

(58) Field of Classification Search
CPC ........ H01B 7/292; H01B 13/00; H01B 13/08; H01B 13/14; H01B 13/22; H01B 9/005;
(Continued)

(56) References Cited

U.S. PATENT DOCUMENTS 4,859,989 A * 8/1989 McPherson ............ H01B 7/328
340/510
8,929,702 B2 * 1/2015 Varkey ................. G02B 6/4416
385/100

(Continued)

FOREIGN PATENT DOCUMENTS

| CN | 102074301 A | 5/2011 |
|---|---|---|
| CN | 102930934 A | 2/2013 |
| CN | 203276901 U | 11/2013 |

*Primary Examiner* — Timothy J Thompson
*Assistant Examiner* — Michael F McAllister
(74) *Attorney, Agent, or Firm* — ScienBiziP, P.C.

(57) ABSTRACT

A hybrid cable applicable in oil wells is disclosed, comprising a FIMT, a conductor layer formed by continuous laser welding and cylindrically covered the outer surface of the FIMT, the outer cylindrical surface of the conductor layer being covered with a high temperature resistant insulating layer by a continuous extrusion method or by wrapped helically with insulating tapes around the outer surface of the conductor layer and the external steel tube cylindrically covered the outer surface of the insulating layer. The conductor layer is coaxial with the FIMT, the inner space of the hybrid cable to accommodating excess length of the optical fiber for thermal expansions or the tensile stress of the optical cable. The thickness of the insulating layer cylindrically covered the outer surface of the conductor layer can be increased, thereby improving the insulating property. A method of manufacturing such hybrid cable is disclosed.

9 Claims, 6 Drawing Sheets

(51) Int. Cl.

| | | |
|---|---|---|
| *H01B 13/22* | (2006.01) | |
| *E21B 47/00* | (2012.01) | |
| *G02B 6/44* | (2006.01) | |
| *E21B 17/00* | (2006.01) | |
| *H01B 7/00* | (2006.01) | |
| *H01B 7/20* | (2006.01) | |
| *H01B 7/02* | (2006.01) | |
| *H01B 7/28* | (2006.01) | |
| *H01B 13/00* | (2006.01) | |
| *H01B 7/29* | (2006.01) | |
| *H01B 7/04* | (2006.01) | |
| *H01B 9/00* | (2006.01) | |

(52) U.S. Cl.
CPC ......... *H01B 7/0018* (2013.01); *H01B 7/0241* (2013.01); *H01B 7/0275* (2013.01); *H01B 7/046* (2013.01); *H01B 7/207* (2013.01); *H01B 7/2806* (2013.01); *H01B 7/292* (2013.01); *H01B 13/0016* (2013.01); *H01B 13/08* (2013.01); *H01B 13/14* (2013.01); *H01B 13/22* (2013.01); *E21B 47/00* (2013.01); *H01B 9/005* (2013.01)

(58) Field of Classification Search
CPC .. H01B 7/0018; H01B 7/0241; H01B 7/0275; H01B 7/046; H01B 7/2806; E21B 47/00; E21B 17/003; G02B 6/4488; G02B 6/4492
USPC ........................................................ 174/70 R
See application file for complete search history.

(56) References Cited

U.S. PATENT DOCUMENTS

| | | | |
|---|---|---|---|
| 9,069,148 B2* | 6/2015 | Herbst | H01B 11/22 |
| 9,691,523 B2* | 6/2017 | Pourladian | H01B 7/221 |
| 2003/0169179 A1* | 9/2003 | James, II | G02B 6/4416 |
| | | | 340/854.9 |
| 2005/0180704 A1* | 8/2005 | Terry | G02B 6/4494 |
| | | | 385/100 |
| 2005/0236161 A1* | 10/2005 | Gay | E21B 47/123 |
| | | | 166/380 |
| 2008/0247718 A1* | 10/2008 | Dowd | E21B 17/206 |
| | | | 385/113 |
| 2012/0160361 A1* | 6/2012 | Fischer | B23K 31/027 |
| | | | 138/145 |
| 2017/0184804 A1* | 6/2017 | Lowell | G02B 6/4416 |
| 2019/0278038 A1* | 9/2019 | Kamath | G02B 6/4488 |

* cited by examiner

PHOTOELECTRIC COMPOSITE CABLE

FIELD

The present disclosure relates generally to a hybrid cable, and more particularly, to a hybrid cable used in oil and gas wells.

BACKGROUND

Hybrid cables are used for transmitting data in the oil and gas well survey. The excellent performance of optical fiber, such as anti-electromagnetic interference, small diameter, light weight, softness, high temperature resistance and corrosion resistance, etc., enable detectors with optical fiber sensing system to overcome the harsh environment in the oil well and measure environmental parameters accurately. Moreover, a detector of optical fiber sensing system with a small cross-sectional area is convenient to use in the well. When in use, the hybrid cable is placed in the well to collect sample data, and the detector receives optical signals and electricity through the hybrid cable. After the survey is completed, the cable is pulled out of the well. The hybrid cable can also be used for other downhole operations.

Design factors of hybrid cables for harsh environment of high pressure and high chemical corrosion (over 200° C., 100 MPa) include, but not limited to, selection of special optical fibers of corresponding temperature grades, and structure design of cables for protecting optical fibers. Existing hybrid cables generally have a number of fiber in the metal tube (FIMT) twisted with a number of circular insulated wires concentrically placed in the outer steel tube of the hybrid cable. The wall thickness of the outer steel tube is designed according to the downhole pressure requirement. Due to limitations on the outer diameter of the hybrid cable, the inner diameter of the steel tube in FIMT is also a fixed value when the outer diameter is constant. Since the thermal expansion coefficient of the metal is much higher than the thermal expansion coefficient of the optical fiber, the steel tube in FIMT becomes elongated when the FIMT is heated. If the optical fiber does not have sufficient excess length, the optical fiber will be stretched by the steel tube, which may result in fiber attenuation increases or even breakage, hence, affecting the efficiency and life expectancy of the fiber.

To provide excess length of the fiber, there must be space for the fiber to be curved. One solution is to increase the outer diameter of the FIMT. However, in the inner circular space defined by the inner diameter, increasing the outer diameter of the FIMT may cause the outer diameter of the insulating layer of the conductor to decrease. Thinning of the insulation layer causes a decrease in the insulation capacity of the conductor. The hybrid cable may not be able to supply power due to damage to the insulation of the wires in challenging environment.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to make the above-mentioned objects, features of the present application more obvious, a description of specific embodiments of the present disclosure will be described with reference to the accompanying drawings. The present disclosure can be implemented in many ways different from those described herein, and those skilled in the art can make similar improvements without violating the contents of the present disclosure. Therefore, the present disclosure is not to be considered as limiting the scope of the embodiments to those described herein.

Several definitions that apply throughout this disclosure will now be presented.

Unless otherwise defined, all technical and scientific terms used herein have the same meaning as commonly understood by one skilled in the art. The terms used in a specification of the present application herein are only for describing specific embodiments, and are not intended to limit the present application.

Figure 1:
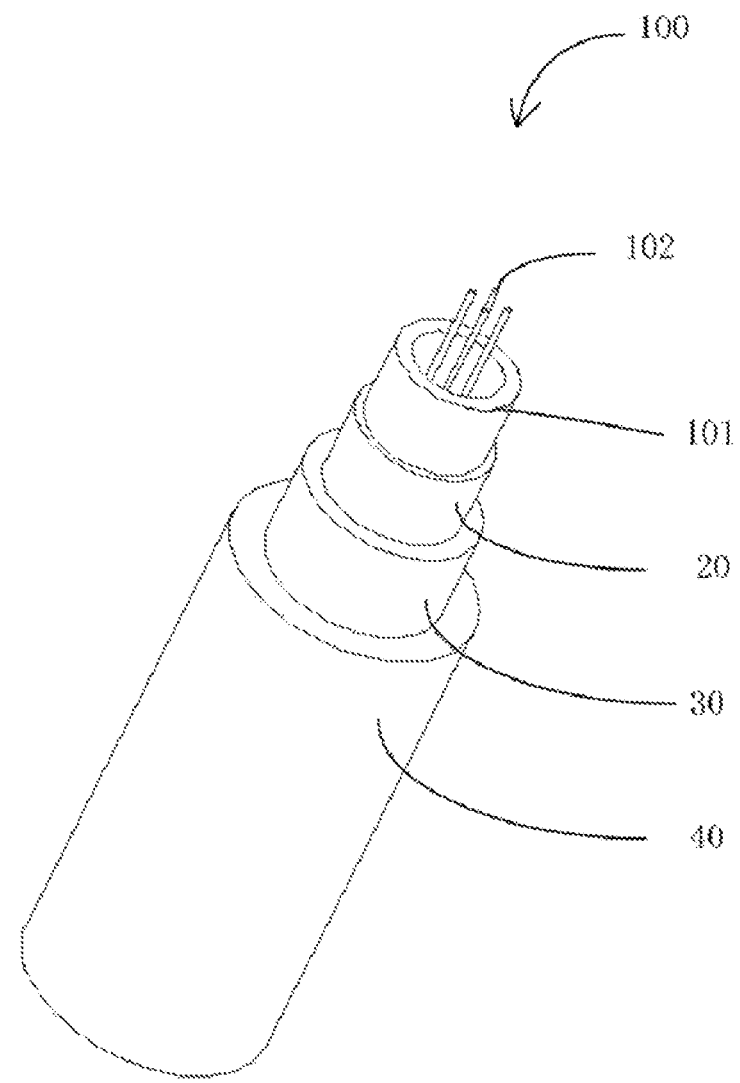
FIG. 1 is a structural diagram of the first embodiment of the hybrid cable of the present disclosure.
Figure 2:
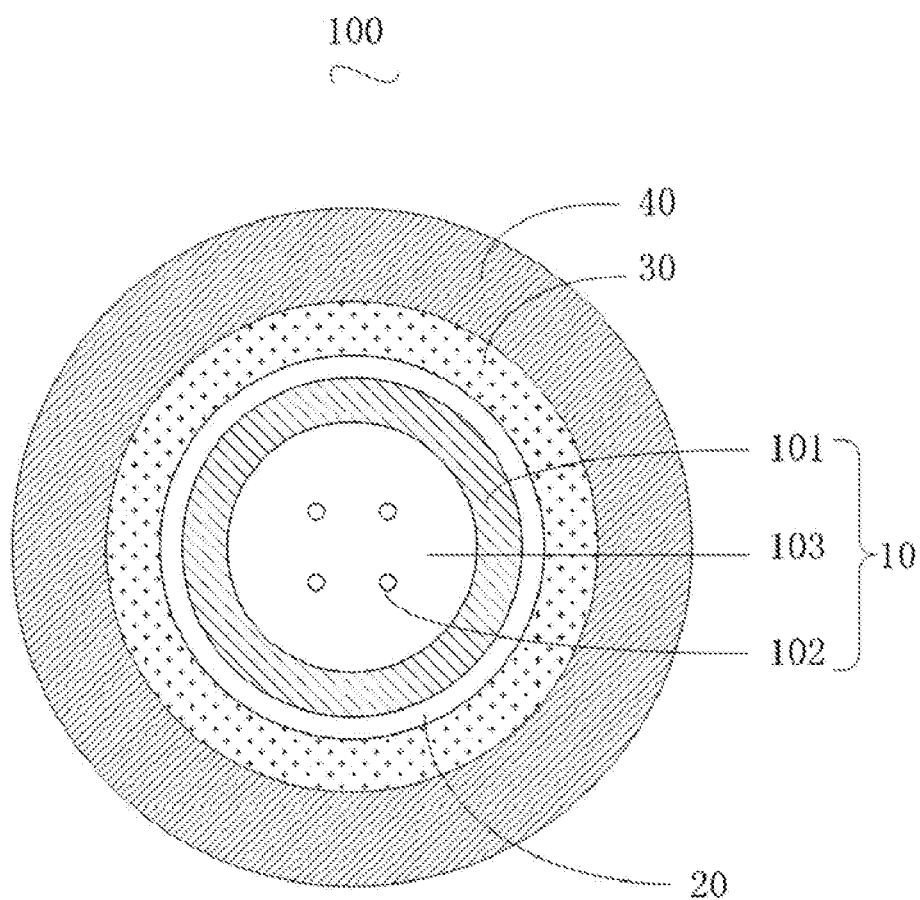
FIG. 2 is a cross-sectional diagram of the first embodiment of the hybrid cable of the present disclosure.

FIG. 1 and FIG. 2 illustrate a structural diagram and a cross-sectional diagram of a hybrid cable in the first embodiment, respectively. The hybrid cable 100 of the present disclosure is applicable in exploration systems in oil wells as a transmission medium with long service life to withstand harsh environment such as high temperature, high pressure and high acid corrosion in the oil wells.

The hybrid cable 100 comprises a FIMT 10, a conductor layer 20 which is cylindrically covered around the outer surface of the FIMT 10, an insulating layer 30 formed by continuously extrusion and cylindrically covered around the outer surface of the conductor layer 20, and an outer steel tube 40 cylindrically covered around the outer surface of the insulating layer 30. The FIMT 10 includes a steel tube 101, a number of optical fibers 102 placed in the steel tube 101 and the gel 103 filling the inner space of the steel tube 101. The optical fibers 102 are embedded within the gel 103. The steel tube 101 is produced by laser welding using 316L stainless steel strip. The gel 103 is hydrogen scavenger gel which has hydrogen absorbing function by adding hydrogen absorbing agent to the gel and prevents hydrogen from harming the fiber. The conductor layer 20 is a smooth copper tube which is formed by continuous laser welding of copper strip and cylindrically covered around the outer surface of the steel tube 101. The wall thickness of the copper tube is less than or equal to 0.15 mm. The copper tube has good electrical conductivity and is used as the electric transmission medium of the hybrid cable 100.

A large amount of hydrogen and free hydrogen are present in the oil wells. Hydrogen or free hydrogen can penetrate the metal protective layer and enter into the fiber core and chemically react with lattice defects or doping elements in the fiber core to form OH bonds. Or hydrogen or free hydrogen can accumulate in the form of hydrogen molecules inside the fiber core. Both of the above phenomena may cause increase in attenuation and affect the transmission performance of the fiber.

Carbon-coated fibers have excellent hydrogen resistance and can avoid attenuation and strength degradation caused by hydrogen and water. However, at elevated temperatures (>170° C.), the carbon coating becomes permeable to hydrogen, losing its hermeticity. Carbon-coated fibers are primarily used for downhole environments where the temperature is <170° C. In addition, the carbon-coated fibers are expensive which increase the cost of hybrid cable 100. Research shows that copper also has excellent hydrogen resistance. Therefore, the copper tube also acts as a barrier to hydrogen diffusion, which can reduce hydrogen diffusion rate in the hybrid cable 100 and the influence of hydrogen induced loss increase in the optical fibers 102, thereby improving the life expectancy of the hybrid cable 100. Compared to carbon-coated fiber, copper has a higher operating temperature of 300° C. and a lower cost as a barrier to hydrogen diffusion in the hybrid cable 100.

In the present embodiment, the copper tube is used as conductor layer 20 and a barrier to hydrogen diffusion. In other embodiments, a copper alloy tube, an aluminum tube, or an aluminum alloy tube can also be used as conductor layer 20.

The insulating layer 30 is made of polymer material. In the present embodiment, polytetrafluoroethylene which has high temperature resistance is used as insulating layer 30. In other embodiments, an insulating layer 30 may be formed by using other high temperature resistant insulating materials depending on the ambient temperature. The insulating layer 30 is extruded continuously and cylindrically covered around the outer surface of the conductor layer 20 in the present embodiment. In other embodiments, the insulating layer 30 can be helically wrapped with insulating tape around the outer surface of the conductor layer 20.

In the present embodiment, the external steel tube 40 is formed by continuous laser welding using a thicker layer of NAS825 alloy steel strip and cylindrically covered around the outer surface of the insulating layer 30. NAS825 alloy is high-corrosion resistant alloy with high nickel content, which has excellent corrosion resistance for oxidizing and non-oxidizing acids in the harsh environment of the oil wells. In other embodiments, other materials such as 316L and A626 can also be used to produce the external steel tube 40.

Figure 3:
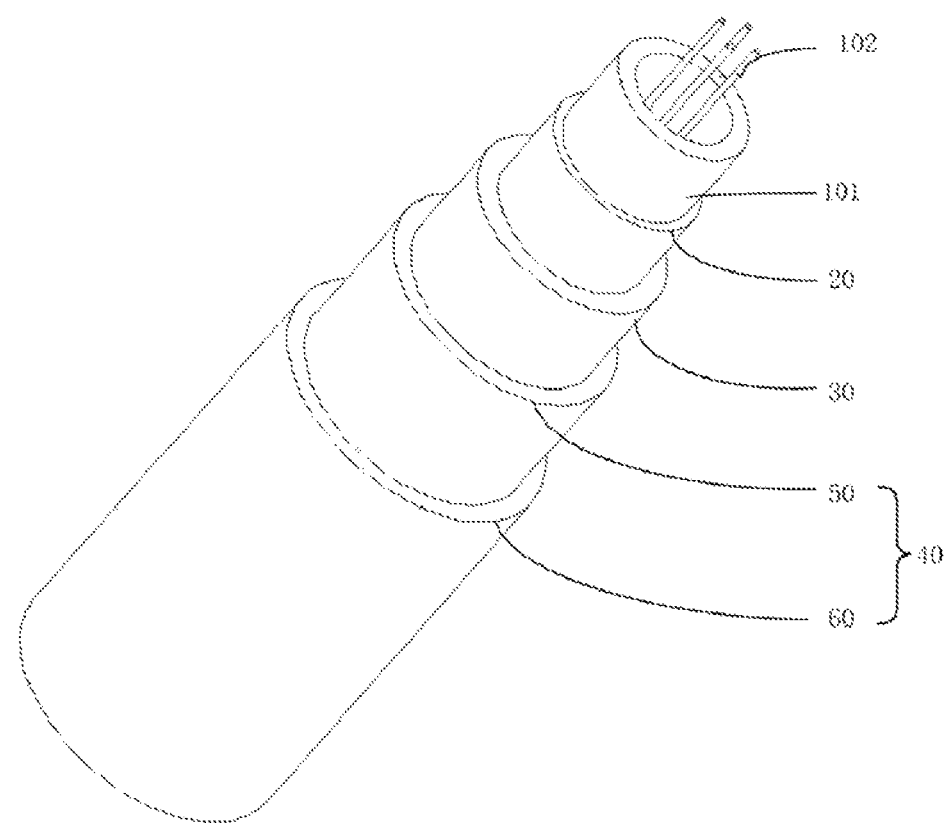
FIG. 3 is a structural diagram of the second embodiment of the hybrid cable of the present disclosure.
Figure 4:
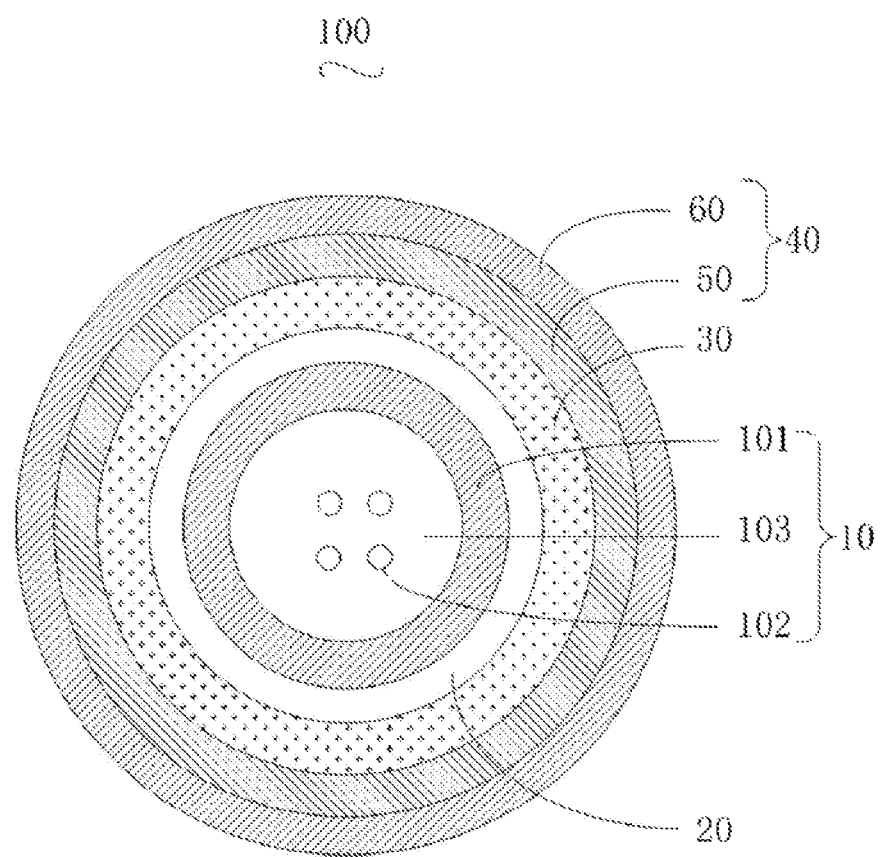
FIG. 4 is a cross-sectional diagram of the second embodiment of the hybrid cable of the present disclosure.

FIG. 3 and FIG. 4 show respectively a structural view and a cross-sectional view of the second embodiment of a hybrid cable 100. The hybrid cable 100 comprises a FIMT 10, a conductor layer 20 which is cylindrically covered around the outer surface of the FIMT 10, an insulating layer 30 formed by continuously extrusion and cylindrically covered around the outer surface of the conductor layer 20, and external steel tube 40 cylindrically covered around the outer surface of the insulating layer 30. The difference from the first embodiment and the second embodiment is that the external steel tube 40 in the second embodiment is composed of two layers of steel tube, an inner steel tube 50 cylindrically covered around the outer surface of the insulating layer 30, and the outer steel tube 60 cylindrically covered around the outer surface of the inner steel tube 50.

Referring to FIG. 3 and FIG. 4, the inner steel tube 50 is formed by continuous laser welding using a 316L stainless steel strip and cylindrically covered around the outer surface of the insulating layer 30. The 316L stainless steel is a molybdenum-containing stainless steel, which has good heat resistance and corrosion resistance. The outer steel tube 60 is formed by continuous laser welding using a thin layer NAS825 alloy steel strip and cylindrically covered around the outer surface of the inner steel tube 50. NAS825 alloy is a high-corrosion resistant alloy with high nickel content, which has excellent corrosion resistance for oxidizing and non-oxidizing acids in the harsh environment of the oil wells.

A thin-walled copper tube cylindrically covered around the outer surface of the steel tube 101 is a conductor layer 20 and a barrier to hydrogen diffusion and is formed by continuous laser welding. Then, a layer of polymer insulation layer 30 is extruded continuously or helically wrapped outside the copper tube so that the copper tube can be used as insulated conductors. The thin-walled copper tube is formed by continuous laser welding, so that leakage welding phenomenon caused by other welding methods such as argon arc welding may be avoided. The continuous length of the thin-walled copper tube can be several tens or hundreds of kilometers.

The wall thickness of the copper tube is less than or equal to 0.15 mm. Factors in determining the wall thickness is mainly to meet requirement of the DC resistance and the insulation capacity. Due to the limited outer diameter, the copper tube according to the present disclosure is thinner than in other hybrid cable 100, hence, the space inside the tube can be utilized effectively. As a result, the electrical performance, optical performance and the ability to withstand hydrogen induced loss increase of the hybrid cable 100 may be improved.

Figure 5:
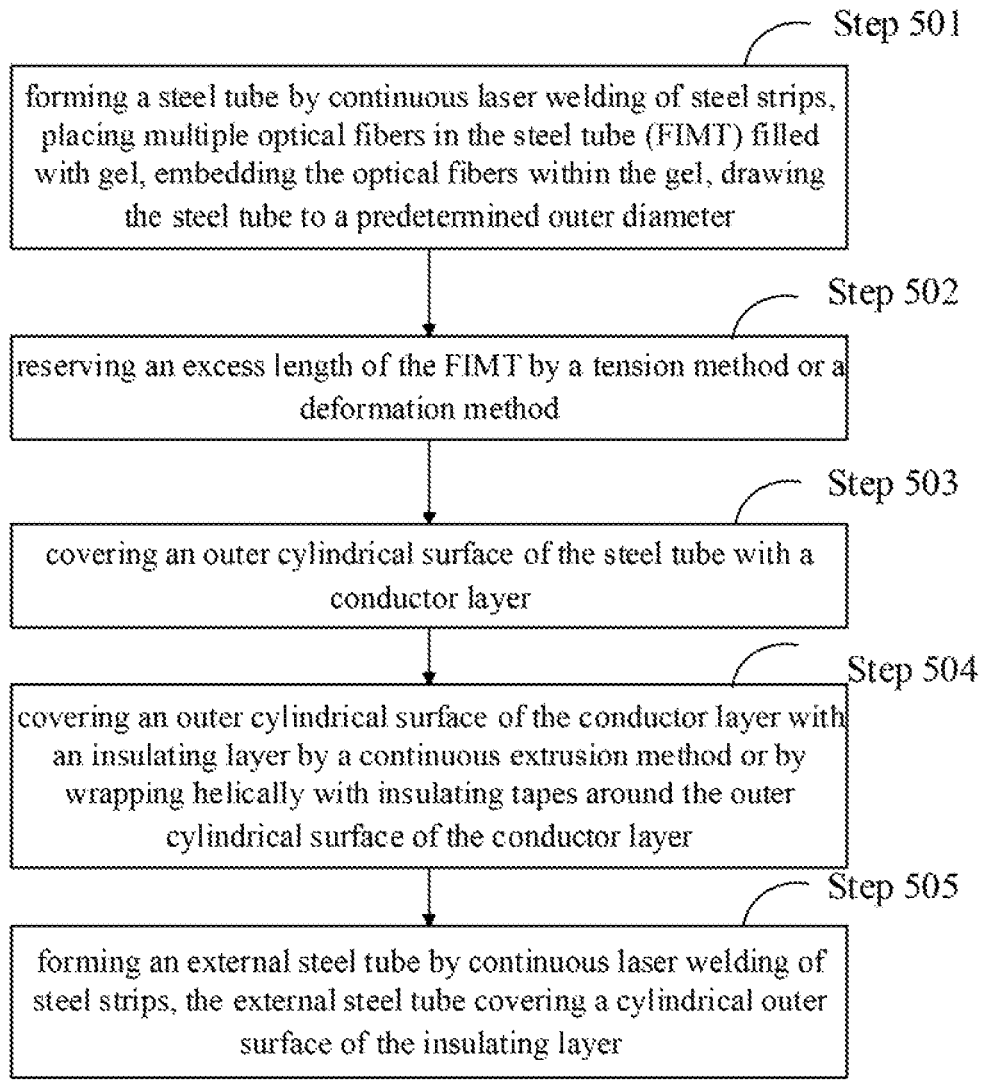
FIG. 5 is a flow chart showing a manufacturing method of the first embodiment of the hybrid cable of the present disclosure.

FIG. 5 is a flow chart showing a manufacturing method of the first embodiment of the hybrid cable of the present disclosure. The method for manufacturing hybrid cable 100 comprises the following steps:

Step 501, forming a steel tube 101 by continuous laser welding of steel strips, placing multiple optical fibers 102 in the steel tube 101 filled with gel 103, embedding the optical fibers 102 within the gel 103, drawing the steel tube 101 to predetermined outer diameter.

Step 502, reserving an excess length of the FIMT 10 by a tension method or a deformation method.

The tension method is used to form the excess length of the FIMT 10 by first, applying a tension to the steel tube 101 within the elastic range, then the tension is released, and the steel tube 101 is retracted, thereby the excess length of the FIMT 10 is reserved within the steel tube 101. In other embodiments, the deformation method can be used to generate the excess length. The steel tube is retracted by plastic deformation, generating excess length.

Step 503, covering an outer cylindrical surface of the steel tube 101 with a conductor layer 20.

The conductor layer 20 is a smooth and dense copper tube formed by continuous laser welding of copper strips and cylindrically covered around the outer surface of the steel tube 101. In other embodiments, the conductor layer 20 can be a copper alloy tube or an aluminum tube or an aluminum alloy tube.

Step 504, covering an outer cylindrical surface of the conductor layer 20 with an insulating layer 30 by a continuous extrusion method or by wrapping helically with insulating tapes around the outer cylindrical surface of the conductor layer 20.

A layer of polytetrafluoroethylene plastic is extruded continuously and cylindrically covered on the outer surface of the conductor layer 20 as an insulating layer 30, so that the copper tube is an insulated conductor. In other embodiments, other insulating polymer with high temperature resistance can be used as the insulating layer 30 according to the use environment. In addition, the insulating layer 30 can be wrapped helically around the outer surface of the conductor layer 20.

Step 505, forming an external steel tube 40 by continuous laser welding of steel strips, the external steel tube 40 covering a cylindrical outer surface of the insulating layer 30.

The external steel tube 40 is formed by continuous laser welding using a layer of NAS825 alloy steel strip and cylindrically covered around the outer surface of the insulating layer 30.

Figure 6:
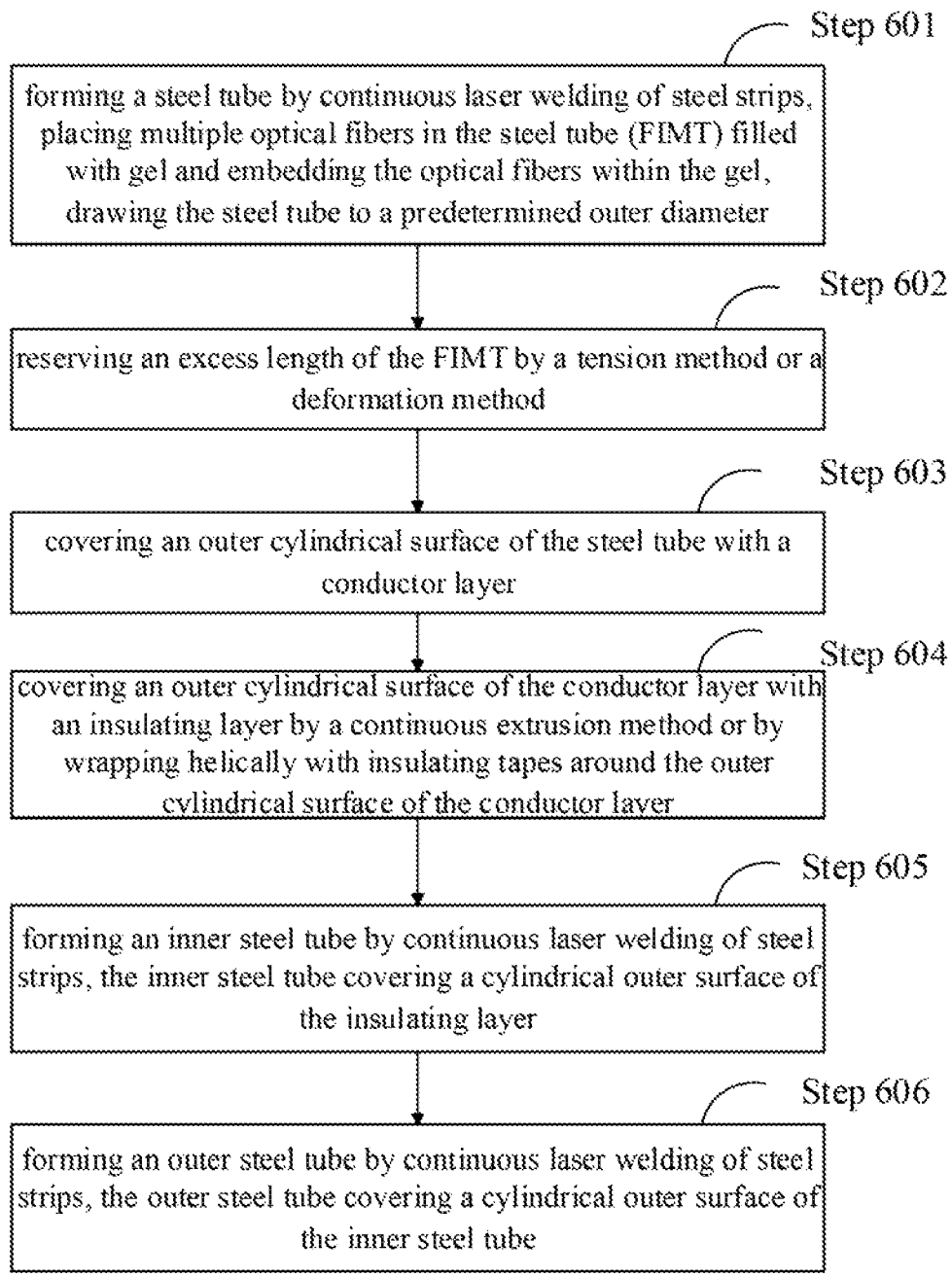
FIG. 6 is a flow chart showing a manufacturing method of the second embodiment of the hybrid cable of the present disclosure.

FIG. 6 is a flow chart showing a manufacturing method of the second embodiment of the hybrid cable 100 of the present disclosure. The second embodiment of the manufacturing method of an hybrid cable 100 differs from the first embodiment in that the manufacture of the external steel tube 40 comprises the following two steps:

Step 605, forming an inner steel tube 50 by continuous laser welding of steel strips, the inner steel tube 50 covering a cylindrical outer surface of the insulating layer 30.

The inner steel tube 50 is formed by continuous laser welding of 316L steel strips and cylindrically covered around the outer surface of the insulating layer 30.

Step 606, forming an outer steel tube 60 by continuous laser welding of steel strips, the outer steel tube covering a cylindrical outer surface of the inner steel tube 50.

The outer steel tube 60 is formed by continuous laser welding of a thin layer of NAS825 alloy steel strip and cylindrically covered around the outer surface of the inner steel tube 50.

The manufacturing method of the hybrid cable 100 has simple process flow. The conductor layer 20 is coaxial with the FIMT 10, which effectively utilizes the inner space of the hybrid cable 100, so that there is sufficient space to reserve excess length of the optical fiber 102 to accommodate the thermal expansion elongation or the tensile stress of the optical cable 102. Furthermore, the thickness of the insulating layer 30 cylindrically covered around the outer surface of the conductor layer 20 can be increased, thereby improving the insulating property. In addition, the hydrogen scavenger gel is used to protect the optical fiber 102 from hydrogen loss. The copper tube is the conductor layer 20 which has good hydrogen barrier performance. The reliability and service life of the hybrid cable can be improved.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A photoelectric composite cable comprising:
   a carbon coated fiber and hydrogen scavenger gel in a fiber in metal tube (FIMT), an excess length of the carbon coated fiber is reserved in the FIMT by a tension method or a deformation method;
   a conductor layer formed by continuous laser welding of copper strips cylindrically covering an outer surface of the FIMT, a wall thickness of the conductor layer is less than or equal to 0.15 mm;
   an insulating layer covering an outer surface of the conductor layer opposite to the FIMT; and
   an external steel tube cylindrically covering an outer surface of the insulating layer opposite to the conductor layer.

2. The photoelectric composite cable as claimed in claim 1, the FIMT comprises a steel tube; multiple optical fibers placed in the steel tube; and gel filling an inner space of the steel tube, the optical fibers being embedded within the gel.

3. The photoelectric composite cable as claimed in claim 1, wherein the conductor layer is a smooth copper tube made of copper strips.

4. The photoelectric composite cable as claimed in claim 2, wherein the conductor layer is a smooth copper tube made of copper strips.

5. The photoelectric composite cable as claimed in claim 1, the conductor layer is a copper alloy tube, an aluminum tube, or an aluminum alloy tube.

6. The photoelectric composite cable as claimed in claim 1, the insulating layer is formed by continuous extrusion and cylindrically covering the outer surface of the conductor layer.

7. The photoelectric composite cable as claimed in claim 1, the insulating layer is wrapped helically around the outer surface of the conductor layer.

8. The photoelectric composite cable as claimed in claim 1, the external steel tube is a single-layer steel tube.

9. The photoelectric composite cable as claimed in claim 1, the external steel tube comprises two layers comprising an inner steel tube and an outer steel tube, the inner steel tube cylindrically covering the outer surface of the insulation layer, and the outer steel tube cylindrically covering the outer surface of the inner steel tube.

* * * * *